United States Patent
McNally et al.

(10) Patent No.: US 6,549,932 B1
(45) Date of Patent: Apr. 15, 2003

(54) SYSTEM, METHOD AND COMPUTER PROGRAM PRODUCT FOR DISCOVERY IN A DISTRIBUTED COMPUTING ENVIRONMENT

(75) Inventors: Michael McNally, Austin, TX (US); Brian Jay Vetter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/089,961

(22) Filed: Jun. 3, 1998

(51) Int. Cl.$^7$ .............................................. G06F 15/16
(52) U.S. Cl. ...................................... 709/202; 709/223
(58) Field of Search ................................. 709/223, 224, 709/244, 105, 239, 240, 313, 317, 318, 320, 202; 370/252, 253, 254; 340/825.06, 825.16; 714/47

(56) References Cited

U.S. PATENT DOCUMENTS

| | | | |
|---|---|---|---|
| 5,113,398 A | | 5/1992 | Howes ...................... 371/11.2 |
| 5,157,667 A | * | 10/1992 | Carusone, Jr. et al. ........ 714/45 |
| 5,187,785 A | | 2/1993 | Shah .......................... 395/575 |
| 5,237,677 A | | 8/1993 | Hirosawa et al. ........... 395/575 |
| 5,282,212 A | | 1/1994 | Shah .......................... 371/15.1 |
| 5,301,270 A | * | 4/1994 | Steinberg et al. ........... 345/866 |
| 5,303,243 A | * | 4/1994 | Anezaki ...................... 714/13 |
| 5,321,813 A | * | 6/1994 | McMillen et al. .......... 714/798 |
| 5,321,837 A | * | 6/1994 | Daniel et al. ................. 707/4 |
| 5,337,360 A | * | 8/1994 | Fischer ...................... 713/176 |
| 5,367,635 A | * | 11/1994 | Baur et al. .................. 709/221 |
| 5,371,126 A | | 12/1994 | Wallace ...................... 371/20.1 |
| 5,410,651 A | * | 4/1995 | Sekizawa et al. ........... 709/224 |
| 5,465,221 A | | 11/1995 | Merat et al. ................. 364/552 |
| 5,526,417 A | | 6/1996 | Dezonno ..................... 379/265 |
| 5,528,748 A | | 6/1996 | Wallace ................. 395/183.02 |
| 5,544,308 A | | 8/1996 | Giordano et al. ...... 395/183.02 |
| 5,550,976 A | | 8/1996 | Henderson et al. .... 395/200.06 |
| 5,566,092 A | | 10/1996 | Wang et al. ........... 364/551.02 |
| 5,572,528 A | * | 11/1996 | Shuen ......................... 370/402 |
| 5,590,126 A | | 12/1996 | Mishra et al. ............... 370/329 |
| 5,596,712 A | * | 1/1997 | Tsuyama et al. .............. 714/26 |
| 5,603,029 A | * | 2/1997 | Aman et al. ................ 709/105 |
| 5,606,693 A | | 2/1997 | Nilsen et al. ................ 395/610 |
| 5,623,628 A | * | 4/1997 | Brayton et al. ............. 711/141 |
| 5,655,081 A | * | 8/1997 | Bonnell et al. ............. 709/202 |
| 5,692,119 A | * | 11/1997 | Koguchi et al. ............... 714/4 |

(List continued on next page.)

OTHER PUBLICATIONS

IBM Technical Disclosure Bulletin, "Enhanced Method for Monitoring Critical Resources in Token Ring Networks," 1/97, vol. 40, No. 1 (pp. 111–112).

IBM Technical Disclosure Bulletin, "Error–Handling Mechanism for Automated Problem Determination Service Agents on IBM Local Area Network Server Network," 10/96, vol. 39, No. 10 (pp. 191–192).

IBM Technical Disclosure Bulletin, "Combining Multiple Layers of Configuration Models into a Single Report," 3/94, vol. 37, No. 3 (pp. 557–560).

*Primary Examiner*—Zarni Maung
*Assistant Examiner*—Jason D. Cardone
(74) *Attorney, Agent, or Firm*—Duke W. Yee; Jeffrey S. LaBaw; Stephen R. Tkacs (57) ABSTRACT

A large distributed enterprise includes computing resources including a management server servicing a plurality of endpoint machines. A management infrastructure include a runtime engine is deployed on given endpoint machines. In response to a task deployment request at an administrative server, discovery agents may be launched into the computer network. When a software agent arrives at a given machine that supports the runtime engine, the agent is executed to determine whether the endpoint is a candidate for a particular task deployment.

29 Claims, 5 Drawing Sheets

U.S. PATENT DOCUMENTS

| | | | |
|---|---|---|---|
| 5,706,422 A * | 1/1998 | Maruyama et al. | 714/4 |
| 5,761,428 A * | 6/1998 | Sidey | 709/223 |
| 5,768,506 A * | 6/1998 | Randell | 709/202 |
| 5,802,291 A * | 9/1998 | Balick et al. | 709/202 |
| 5,805,884 A * | 9/1998 | Sitbon et al. | 709/320 |
| 5,809,238 A * | 9/1998 | Greenblatt et al. | 709/202 |
| 5,815,652 A * | 9/1998 | Ote et al. | 714/31 |
| 5,826,020 A * | 10/1998 | Randell | 709/202 |
| 5,838,918 A * | 11/1998 | Prager et al. | 709/221 |
| 5,872,931 A * | 2/1999 | Chivaluri | 709/223 |
| 5,887,171 A * | 3/1999 | Tada et al. | 709/317 |
| 5,901,286 A * | 5/1999 | Danknick et al. | 709/203 |
| 5,913,037 A * | 6/1999 | Spofford et al. | 709/226 |
| 5,920,692 A * | 7/1999 | Nguyen et al. | 709/204 |
| 5,944,782 A * | 8/1999 | Noble et al. | 709/202 |
| 5,944,783 A * | 8/1999 | Nieten | 709/202 |
| 5,958,009 A * | 9/1999 | Friedrich et al. | 709/224 |
| 5,958,016 A * | 9/1999 | Chang et al. | 709/229 |
| 5,987,135 A * | 11/1999 | Johnson et al. | 709/224 |
| 6,006,251 A * | 12/1999 | Toyouchi et al. | 709/203 |
| 6,009,456 A * | 12/1999 | Frew et al. | 709/202 |
| 6,012,152 A * | 1/2000 | Douik et al. | 714/26 |
| 6,029,175 A * | 2/2000 | Chow et al. | 707/104.1 |
| 6,049,819 A * | 4/2000 | Buckle et al. | 709/202 |
| 6,055,562 A * | 4/2000 | Devarakonda et al. | 709/202 |
| 6,061,721 A * | 5/2000 | Ismael et al. | 709/223 |
| 6,073,162 A * | 6/2000 | Joannsen et al. | 709/202 |
| 6,075,863 A * | 6/2000 | Krishnan et al. | 713/191 |
| 6,088,727 A * | 7/2000 | Hosokawa et al. | 709/223 |
| 6,094,673 A * | 7/2000 | Dilip et al. | 709/202 |
| 6,108,782 A * | 8/2000 | Fletcher et al. | 713/153 |
| 6,112,225 A * | 8/2000 | Kraft et al. | 709/202 |
| 6,185,611 B1 * | 2/2001 | Waldo et al. | 709/221 |
| 6,240,451 B1 * | 5/2001 | Campbell et al. | 709/224 |
| 6,266,709 B1 * | 7/2001 | Gish | 709/315 |
| 6,266,805 B1 * | 7/2001 | Nwana et al. | 717/4 |
| 6,330,597 B2 * | 12/2001 | Collin et al. | 709/220 |
| 6,336,139 B1 * | 1/2002 | Feridun et al. | 709/224 |
| 6,363,421 B2 * | 3/2002 | Barker et al. | 709/223 |

* cited by examiner

SYSTEM, METHOD AND COMPUTER PROGRAM PRODUCT FOR DISCOVERY IN A DISTRIBUTED COMPUTING ENVIRONMENT

BACKGROUND OF THE INVENTION

1. Technical Field

The present invention is directed to managing a large distributed computer enterprise network and, more particularly, to performing discovery operations therein preferably using software components that are deployed in the network and adapted to be executed in local runtime environments.

2. Description of the Related Art

Today, companies desire to place all of their computing resources on the company network. To this end, it is known to connect computers in a large, geographically-dispersed network environment and to manage such an environment in a distributed manner. One such management framework comprises a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. As the number of managed nodes increases, the system maintenance problems also increase, as do the odds of a machine failure or other fault.

The problem is exacerbated in a typical enterprise as the node number rises. Of these nodes, only a small percentage are file servers, name servers, database servers, or anything but end-of-wire or "endpoint" machines. The majority of the network machines are simple personal computers ("PC's") or workstations that see little management activity during a normal day.

System administrators typically manage such environments through system and network tasks that are configured by the administrator on some local machine and then distributed or deployed into the network. A machine that is to receive the task is referred to as a deployment "target". The locations and characteristics of the target machines, however, are typically determined by the administrator manually. Thus, for example, if the task to be deployed is a database management application, the administrator must specify the particular database servers in the network. This process is cumbersome and time-consuming, especially as the size of the network increases to include thousands of connected machines. If the system administrator does not specify all target machines, the system administration task may be implemented incorrectly. Alternatively, if the number and location of targets is over-specified, network resources are consumed unnecessarily.

In addition, there are many other reasons why network administrators have an interest in performing so-called "discovery" operations in such a large managed environment. As one example, an administrator may desire to determine how many and which machines in the environment presently support a given version of a software program. Discovery may also be required to determine whether a particular machine has sufficient resource (e.g., available disk storage) to support a software upgrade. Yet another reason to perform a discovery operation might simply involve a need or desire to perform system or resource inventory to facilitate planning for future enterprise expansion. The nature and types of discovery: operations are thus quite varied.

Known distributed management architectures do not afford the system administrator the ability to issue a distribution request and deploy a task without having to manually associate the tasks with given groups of machines. Likewise, such known techniques have not been readily adapted to facilitate a wide range of basic discovery operations that are desired to facilitate system administration, management and maintenance in such an environment, especially as the network grows to include thousands of connected, managed machines.

The present invention addresses these and other associated problems of the prior art.

BRIEF SUMMARY OF THE INVENTION

It is thus a primary object of this invention to perform discovery operations in a distributed computer enterprise environment in which a large number of machines are connected and managed.

It is another primary object of this invention to deploy discovery agents in the distributed computer network that are executed in local runtime environments to perform such discovery operations.

Another primary objective of this invention is to provide software components that are readily deployed into a distributed, managed environment for discovering given facts (e.g., machine and/or source identity, characteristics, state, status, attributes, and the like) that are then useful in controlling a subsequent operation (e.g., a task deployment).

A more specific object of this invention is to provide a mechanism by which a dispatcher may identify particular machines that are candidates to receive a task deployment so that an administrator or other user need not manually associate the task with given groups of machines.

It is a particular object of this invention to deploy a Java-based software "discovery agent" into a distributed computer network environment to discover particular machines or resources that are to be targeted to receive a particular task deployment within the network.

A further object of this invention to launch a set of one or more discovery agents into a large, distributed computer network in response to a given request for the purpose of identifying and locating suitable target machines or resources for receipt of a given task. The task may be an administrative task, a management task, a configuration task, or any other application.

A further specific object of this invention is to customize or tailor the software agent dispatched in the network for discovery purposes as a function of the type of task to be subsequently deployed. Thus, the software agent may more readily determine whether a candidate machine may qualify as a potential target for the deployment.

Yet another more general object of this invention is to more fully automate the discovery of distribution targets in a large, distributed computing network and thereby reduce the expense and complexity of system administration.

Another object of the present invention is to initially dispatch a minimum amount of code that may be necessary to discover distribution targets for a subsequent task deployment in a large computer network.

It is a further object of this invention to deploy a self-routing software agent into a distributed computer network to discover workstations that satisfy a given criteria. During a particular search, a given agent may "clone" itself at a particular node to continue the search along a new network path.

Yet another more general object of the present invention is to collect information about workstations in a large computer networked environment as mobile discovery agents are dispatched and migrated throughout the network.

These and other objects of the invention are achieved by the disclosed system, method and computer product for discovery in a large, distributed computer networking environment. A management infrastructure supported in the networking environment includes a dispatch mechanism, which is preferably located at a central location (e.g., an administrative server), and a runtime environment supported on given nodes of the network. In particular, the runtime environment (e.g., an engine) is preferably part of a distributed framework supported on each managed node of the distributed enterprise environment.

One preferred method begins upon a distribution request. The distribution request is not limited to any particular type of system or network administration, configuration or management task. In response to the request, the dispatch mechanism determines whether the machines targeted for the deployment (namely, the "target machines") can be identified from local sources (e.g., a local repository of previously-collected or generated configuration information). If such information is not available or it otherwise not useful, the dispatch mechanism deploys into the network a set of one or more "discovery agents" that are tasked to locate and identify suitable target(s) for the deployment. These one or more agents then "fan-out" into the network to collection information to facilitate subsequent task deployment. Preferably, the discovery agent is a small piece of code that is customized or tailored as a function of the particular task to be later deployed. This customization reduces the time necessary to complete an overall search because the agent thus may be "tuned" to evaluate the candidate node for a particular characteristic. If that characteristic is not present, the software agent may then proceed elsewhere (or clone itself to follow a new network path).

When a particular discovery agent arrives at a node in the network, the software agent preferably is linked into the local runtime environment already present to thereby initiate a local discovery process. The discovery routine executed by the discovery agent may discover that the local machine (or some resource or application thereon) is a suitable target, that the local machine (or some application thereon) is not a suitable target, or that insufficient information is available to make this determination. Based on information obtained during the discovery process, the software agent also may identify one or more new network paths that must be traversed to continue the discovery process and thereby complete the search. The software agent may then launch itself to another node, or it may "clone" itself and launch a "cloned" agent over the new network path as needed.

If the software agent discovers that the candidate machine is a suitable target, certain identifying information (e.g., a confirmation, a machine identifier, a state identifier or the like) is generated. The identifying information is then saved within a datastore associated with the agent (if the agent is to return to the dispatch mechanism) or, alternatively, such information is transmitted back to the dispatch mechanism (if the agent is to extinguish itself upon completion of the discovery process). Such transmission may be effected using a simple messaging technique. When a given network path is exhausted, the discovery agent then either returns to the dispatch mechanism or extinguishes itself, as the case may be.

Thus, at each node, the software agent is preferably run by the runtime engine previously deployed there. Alternatively, the software agent runs as a standalone process using existing local resources. When the suitability of the workstation (as a target machine) is indeterminate, the software agent may obtain additional code from the dispatch mechanism or from some other network source to facilitate its determination. Such additional code may be another software agent.

While one preferred "discovery" operation involves a determination of whether a given machine or resource is a suitable target for a task deployment, other more discovery operations may be implemented in like manner. Thus, a discovery operation may be implemented for inventory control, for determining which machines support which versions of given software, for determining the ability of a given machine or an associated resource to support given software or to perform a given task, and the like.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
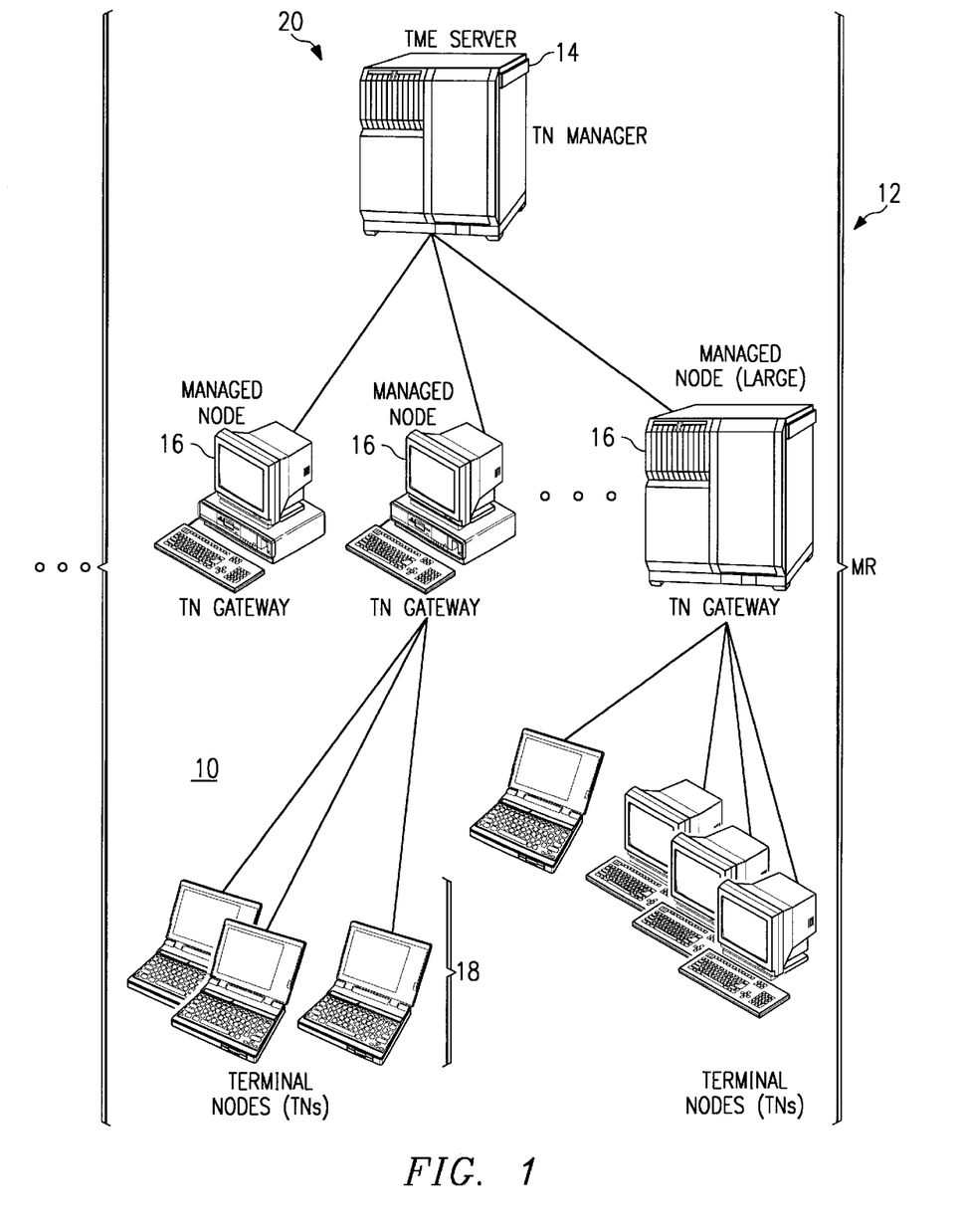
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn support a plurality of endpoints 18. The server 14 coordinates all activity within the MR using a terminal node manager 20.

Figure 2:
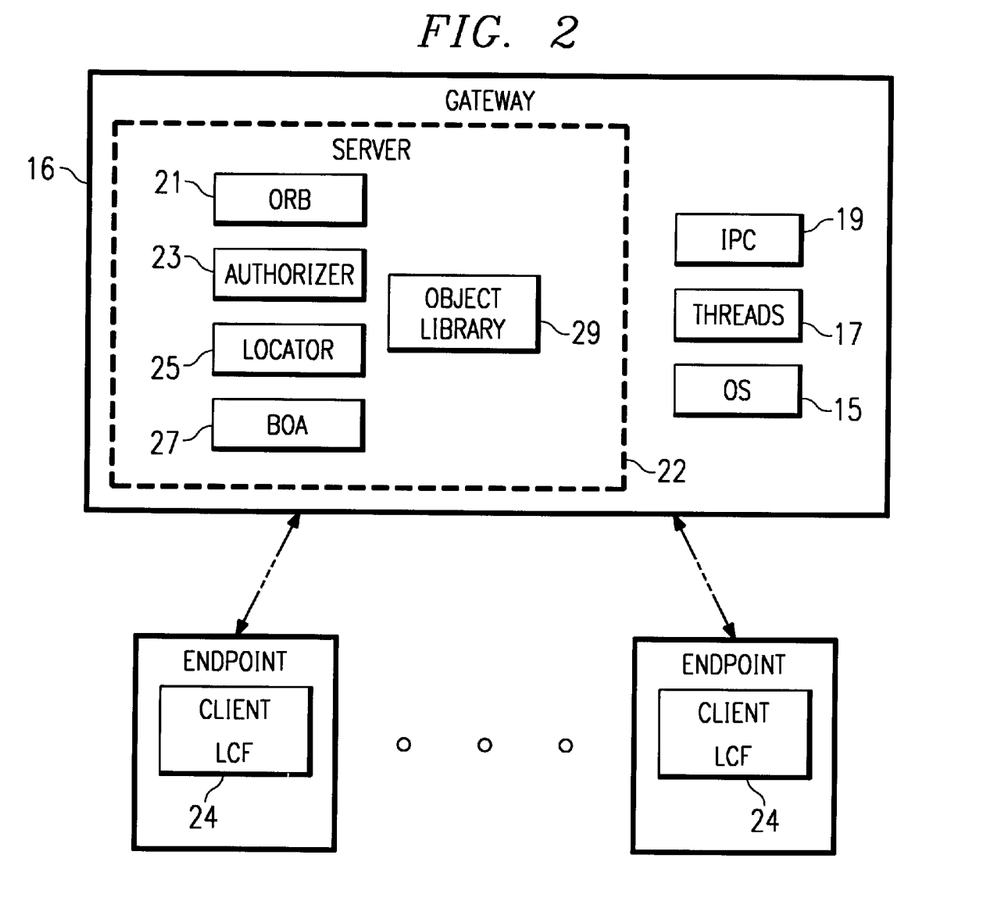
FIG. 2 is a block diagram of a preferred system management framework illustrating how the framework functionality is distributed across the gateway and its endpoints within a managed region.

Referring now to FIG. 2, each gateway machine 16 runs a server component 22 of a system management framework. The server component 22 is a multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machine 16 also includes an operating system 15 and a threads mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 3:
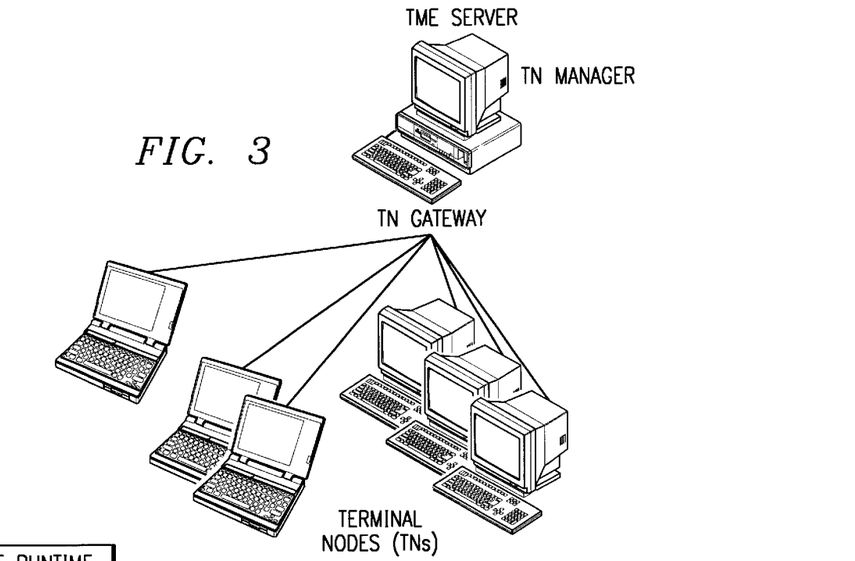
FIG. 3 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 3, a single server-class machine may be used as the server and gateway, and the client machines would run a low maintenance framework References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoint and gateway, and this mapping is preferably dynamic.

As noted above, there are one or more gateways per managed region. Preferably, a gateway is a fully-managed node that has been configured to operate as a gateway. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2A:
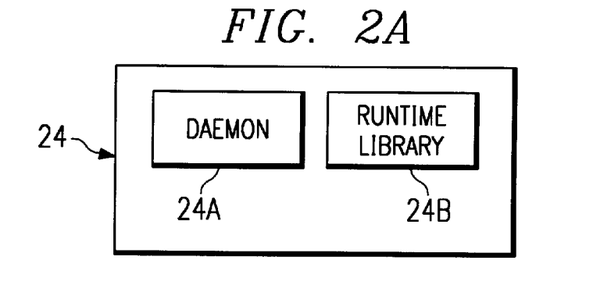
FIG. 2A is a block diagram of the elements that comprise the LCF client component of the system management framework.

As also discussed above, the endpoint is a machine running the system management framework client component, which is referred to herein as the low cost framework (LCF). The LCF has two main parts as illustrated in FIG. 2A: the LCF daemon 24a and an application runtime library 24b. The LCF daemon 24a is responsible for endpoint login and for spawning application endpoint executables. Once an executable is spawned, the LCF daemon 24a has no further interaction with it. Each executable is linked with the application runtime library 24b, which handles all further communication with the gateway.

Preferably, the server and each of the gateways is a computer or "machine." For example, each computer may be a RISC System/6000® (a reduced instruction set or so-called RISC-based workstation) running the AIX( (Advanced Interactive Executive) operating system, preferably Version 3.2.5 or greater. Suitable alternative machines include: an IBM-compatible PC x86 or higher running, Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows '95 or greater operating system. IBM® or IBM-compatible machines running under the OS/2® operating system may also be implemented as the endpoints. An endpoint computer preferably includes a browser, such as Netscape Navigator or Microsoft Internet Explorer, and may be connected to a gateway via the Internet, an intranet or some other computer network.

Figure 4:
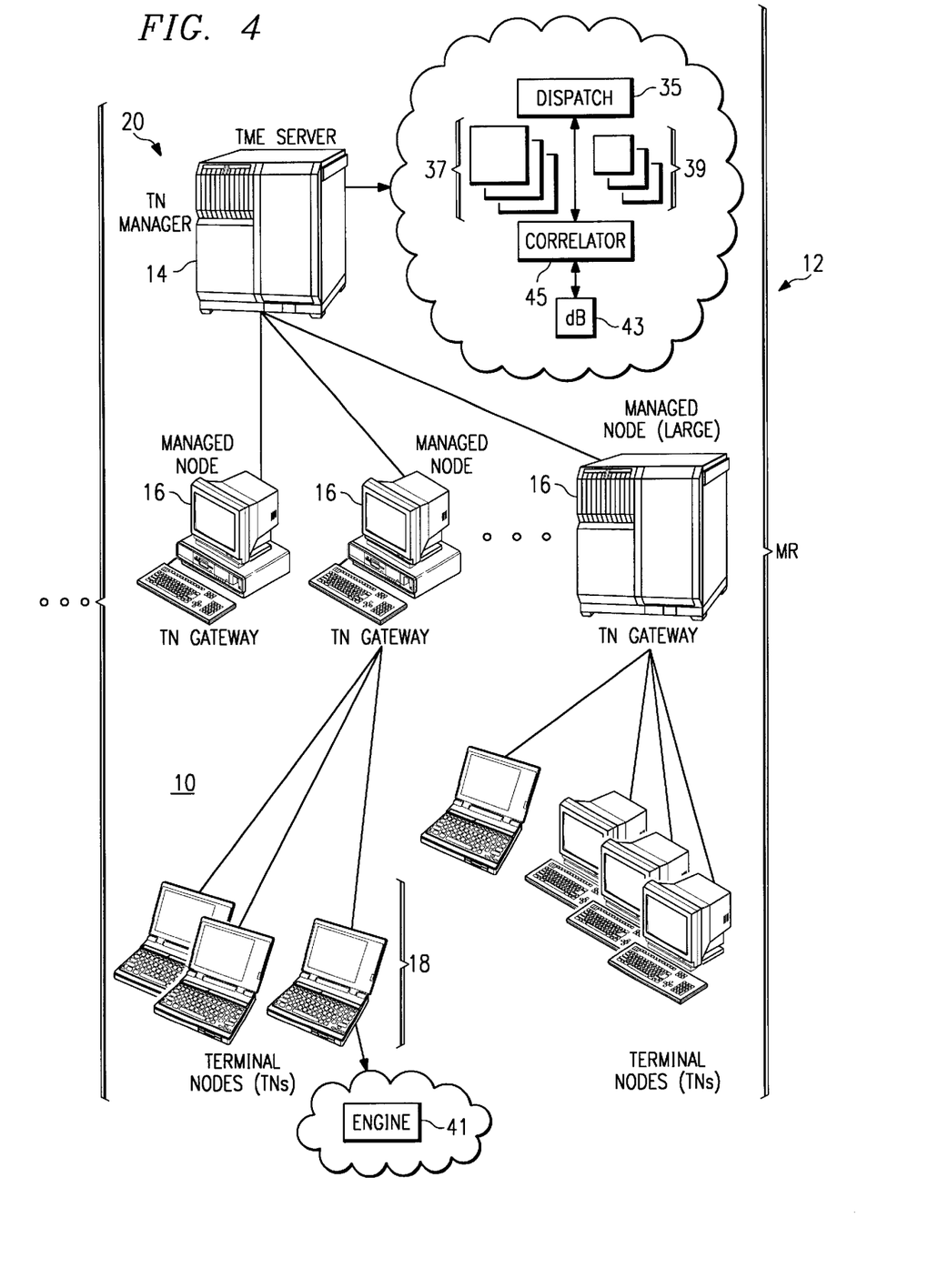
FIG. 4 is a distributed computer network environment having a management infrastructure for use in carrying out the preferred method of the present invention.

A preferred embodiment of the present invention is implemented in the enterprise environment as illustrated in FIG. 4. As will be discussed below, a set of software "discovery agents" are available at a central location (e.g., manager 14) or at a plurality of locations (e.g., the gateways 16) in the network where administrative, configuration or other management tasks are specified, configured and/or deployed. The software agents are "mobile" in the sense that the agents are dispatched (as will be described below) from a dispatch mechanism and then migrate throughout the network environment.

Generally, the mobile software agents traverse the network to perform so-called "discovery" operations. The particular types of discovery operations may be quite varied. Thus, for example, a particular discovery operation may be initiated by a user at a managing resource through a conventional graphical user interface (GUI) once the discovery application is started. This operation may simply issue one or more discovery agents to query each of set of machines (at which a given agent is executed) to determine the machine "type". The discovery operation may identify a list of resources associated with the given machine. The discovery operation may identify whether the given machine has a resource of a particular type. Another discovery operation may simply query the machine to discover whether the machine or some associated resource has a given characteristic. An example of the latter situation is where a discovery operation is initiated at the given machine to determine whether a specific resource (e.g., a disk drive partition) meets some defined criteria (e.g., storage space). The particular discovery operation thus may be quite general or very specific, and the given operation may relate to an existing state (e.g., existing resources or their operational state) or, alternatively, to determine whether the machine can support other resources in the future (e.g., for a planned system expansion). An example of the latter situation is when the network administrator desires to perform an inventory of existing machines to determine which of those machines might require a software upgrade.

In a representative application, a network administrator desires to monitor a given resource in the distributed computer environment. In such case, of course, the nature of the discovery agent may be directly linked to the monitoring component on whose behalf it is working. Thus, for a monitoring component that wishes to monitor some metric available only from particular operating systems, a discovery agent would then report successful discovery only on such systems.

Some monitoring components may be intended to monitor certain resource types wherein several instances of the resource may be present on any given computer. Such resources include, for example, disk drives or components thereof (namely, file systems), processes of a particular type, log files of a particular type, and the like. The discovery agents for these components may then be designed to find instances of such resources on a given computer and then, if desired, to cause the instantiation of a copy of the monitoring component for each resource found.

Some discovery agents are designed to continually monitor the state of a system so that resources that dynamically appear and disappear may be tracked. Such agents typically scan for resource instances according to some simple scheduling metric. An example of such a resource is an active connection between a client and some software server process.

As a result of the discovery process, it is often the case that information discovered is collected and desired to be returned to the dispatcher or some other location. The particular information returned to the user will necessarily depend on the type of discovery operation initiated. The presentation and formatting of such information is a matter of design choice and is not a limitation of the present invention. To give an example, if the discovery operation merely seeks the identity of all machines that have "version x.y" of a given software routine, then the returned information may be a mere ordered list of the identified resources displayed in a scrollable listbox or other known GUI construct.

In the illustrative embodiment discussed below, the, discovery operation determines which machines in the managed environment are to receive a particular task deployment, e.g., a distributed monitoring application for use in managing resources throughout the distributed network. Although this example is described at length, one of ordinary skill will appreciate that the nature, type and characteristics of particular discovery operations may be quite varied depending on the circumstances. The present invention is not limited to any particular discovery operation or any defined set of such operations.

In this illustrative embodiment, a particular task to be deployed in the environment may be specified but thetarget machines may not be readily ascertainable. In such case, an appropriate "discovery" agent is identified and dispatched to determine this information. If the agent does not find a target machine at the initial location examined, the agent (or a clone thereof) then migrates through the network to continue the search. The agent preferably chooses its path through the network based on the information received at the dispatching location, as well as optionally from information gleaned from each examined location. As will be seen, the particular "path" typically varies as the software discovery agent migrates through the network because information gleaned from a particular node may redirect the discovery agent in some given manner.

For illustrative purposes only, one such discovery method is implemented in the large, distributed enterprise environment shown in FIG. 4, although this is not a limitation of the invention. In this example, the manager 14 includes the dispatch mechanism 35 having a set of software agents 37 associated therewith. Alternatively, dispatch mechanism 35 may include a set of configurable software tasks 39 from which one or more agents are constructed. Manager 14 preferably also includes a database 43 including information identifying a list of all machines in the distributed computing environment that are designed to be managed. The dispatch mechanism itself may be distributed across multiple nodes.

At least some of the gateway nodes 16 and at least some of the terminal nodes 18 (or some defined subset thereof) include a runtime engine 41 that has been downloaded to the particular node via a distribution service. The engine 41 provides a runtime environment for the software agent. Although not meant to be limiting, the particular distribution technique may involve a subscription process such as described in Ser. No. 08/414,960, titled "Method For Managing Distributed Computer Network Configuration Information" and assigned to the assignee of the present invention. Alternatively, the diagnostic engines may be distributed to the various nodes via the technique described in Ser. No. xx/xxx,xxx, titled "Drag And Drop Technique For Distributing Visual Builder Built Tasks In A Computer Network", which is also assigned to the assignee of this invention. Those disclosures are incorporated herein by reference.

As noted above, the present invention automatically deploys one or more of the software discovery agents to perform a given discovery operation (e.g., to locate a particular machine, a resource thereon, or the like) to facilitate a particular administration, configuration or other management task (or perhaps some other service) specified by an administrator or other system entity. Preferably, the software agent is a software component (i.e. a piece of code) executed by the runtime engine located at the node at which the agent arrives. Alternatively, the software agent runs as a standalone application using local resources. Yet another alternative is to have the software agent control a engine which, in turn, examines the host platform and then performs the discovery operation (in this example, determining the suitability of the host to receive the target task deployment).

In a representative embodiment, both the runtime engine and the software agent(s) are conveniently written in Java. As is known in the art, Java is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser.

In one particular embodiment of the present invention, a software agent is a Java applet (e.g., comprised of a set of Java "class" files) and the runtime environment includes a Java Virtual Machine (JVM) associated with a Web browser. In this illustrative example, various nodes of the network are part of the Internet, an intranet, or some other computer network or portion thereof.

When the administrator configures a task for deployment, the dispatch mechanism compiles the appropriate Java class files (preferably based on the task or some characteristic thereof) and dispatches the applet (as the software agent) in the network. Depending on the size, configuration and/or topology of the network, multiple agents may be dispatched. Each applet is then executed on the JVM located at a candidate node to determine whether the node is an appropriate target for the deployment of the task.

Figure 5:
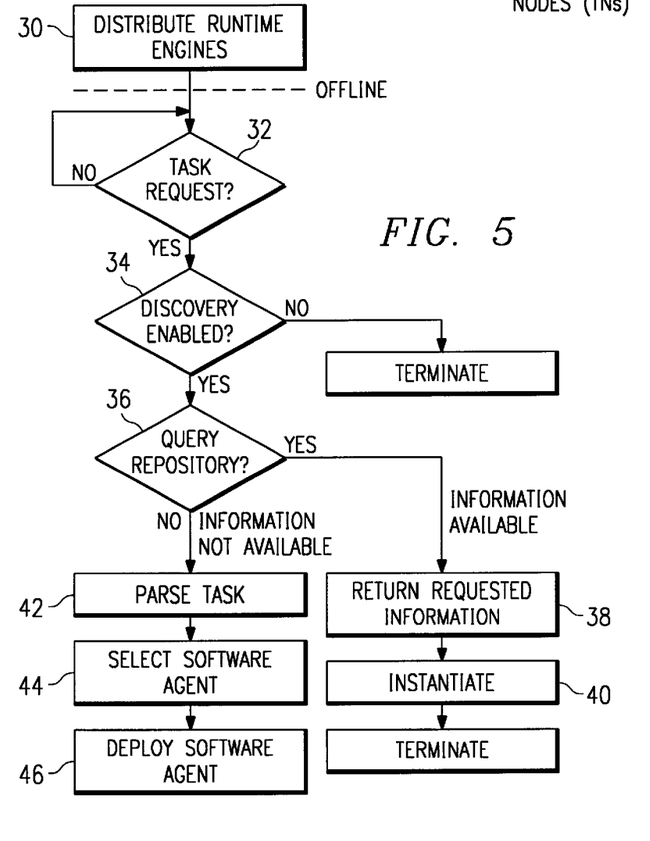
FIG. 5 is a flowchart illustrating a preferred method of deploying a software discovery agent in response to a distribution request in the computer network.

FIG. 5 is an illustrative discovery routine according to the present invention. Portions of this routine may and often do take place at different times and under different control circumstances. They are illustrated and described together merely to simplify the description.

The routine begins at step 30 with the distribution of the runtime engines to the various nodes. In this embodiment, the runtime engine may be part of the LCF runtime library 24B, as has been previously described. More likely, the runtime engine is deployed before the runtime library during a prior node configuration task. In either case, these runtime engines collectively form a part of a management infrastructure of the enterprise environment. Once the management infrastructure is in place, the-actual operating routine begins.

At step 32, a test is performed at the dispatch mechanism 15 to determine whether a given occurrence, e.g., a task deployment request, a method invocation, or the like, has been generated or received from elsewhere in the network. In the case of a task deployment as described above, an administrator performs the desired task configuration using a conventional GUI. The particular task configuration or specification technique is not part of the present invention. Step 32, of course, may represent any given function and is not limited to mere task deployment. For the ease of further discussion, however, it is assumed that the discovery process is ancillary to one such deployment.

If the outcome of the test at step 32 is negative, the routine cycles as shown. If, however, the outcome of the test at step 32 indicates that a task to be deployed has been specified, the method continues at step 34.

At step 34, a test is performed to determine if the discovery process has been enabled by the system or system administrator, together with the nature of the specification. Although not meant to be limiting, the administrator may enable the discovery process (and specify the discovery operation in particular) by using the GUI, a command line interface (CLI) or any other known interface technique. If the outcome of the test at step 34, the routine terminates. If the discovery process has been enabled as indicated by a positive outcome to the test at step 34, the routine continues at step 36 to query a repository 43 (e.g., in the management-server) to determine whether the target machines and their characteristics (e.g., location, state, status, configuration, and the like) have already been discovered or specified. If the outcome of the test at step 36 is positive, the routine returns information to the dispatch mechanism at step 38 and the returned data is then instantiated as needed at step 40. If this path is taken, the routine then terminates because discovery is not needed.

If, however, the result of the query at step 36 indicates that the necessary information is not available from the repository (e.g., because such a repository does not exist, because certain information needed to tailor the distribution has not been collected, because information is outdated due to given aging factors, etc.), the routine continues at step 42. In particular, the task to be deployed is parsed to identify one or more search characteristics. This step may be carried out automatically or be controlled by information specified by the user (e.g., through the GUI). Thus, for example, if the task to be deployed is a database management task that will be supported on database servers, step 42 may identify a given characteristic of a candidate machine to facilitate the search process. In this example, that characteristic may be "machines with resident database server software" or the like. To facilitate this process, the GUI may display icons or other visual devices that may be selected to form associations with machines, resources or their attributes. Any convenient specification or selection mechanism may be implemented, of course. By identifying one or more characteristics of the task to be deployed, the inventive mechanism may tailor or customize a software agent to look for certain specific hardware, software or other components on a candidate machine in a more efficient manner.

To this end, the routine then continues at step 44 to select, construct or subclass an appropriate software agent based on the given characteristics derived in step 42, upon some other user-selected or system-selected criteria, or based on some other information such as historical data. As used herein, the selection process of step 44 may involve compiling one or more software tasks into a "custom" software agent for this purpose. Thus, the present invention covers the use of an existing software agent, as well as an agent that is created or generated "on-the-fly".

At step 46, the software agent is deployed into the network. The agent includes appropriate routines designed to enable the code to be dropped into the local execution context and controlled to effect the specific discovery operation. Step 46 may involve deployment of multiple agents (dispatched concurrently or progressively) depending on the topology of the network. As previously noted, each software agent is a mobile "discovery" agent whose purpose is to discover the distribution information. This completes the discovery agent deployment routine.

Figure 6:
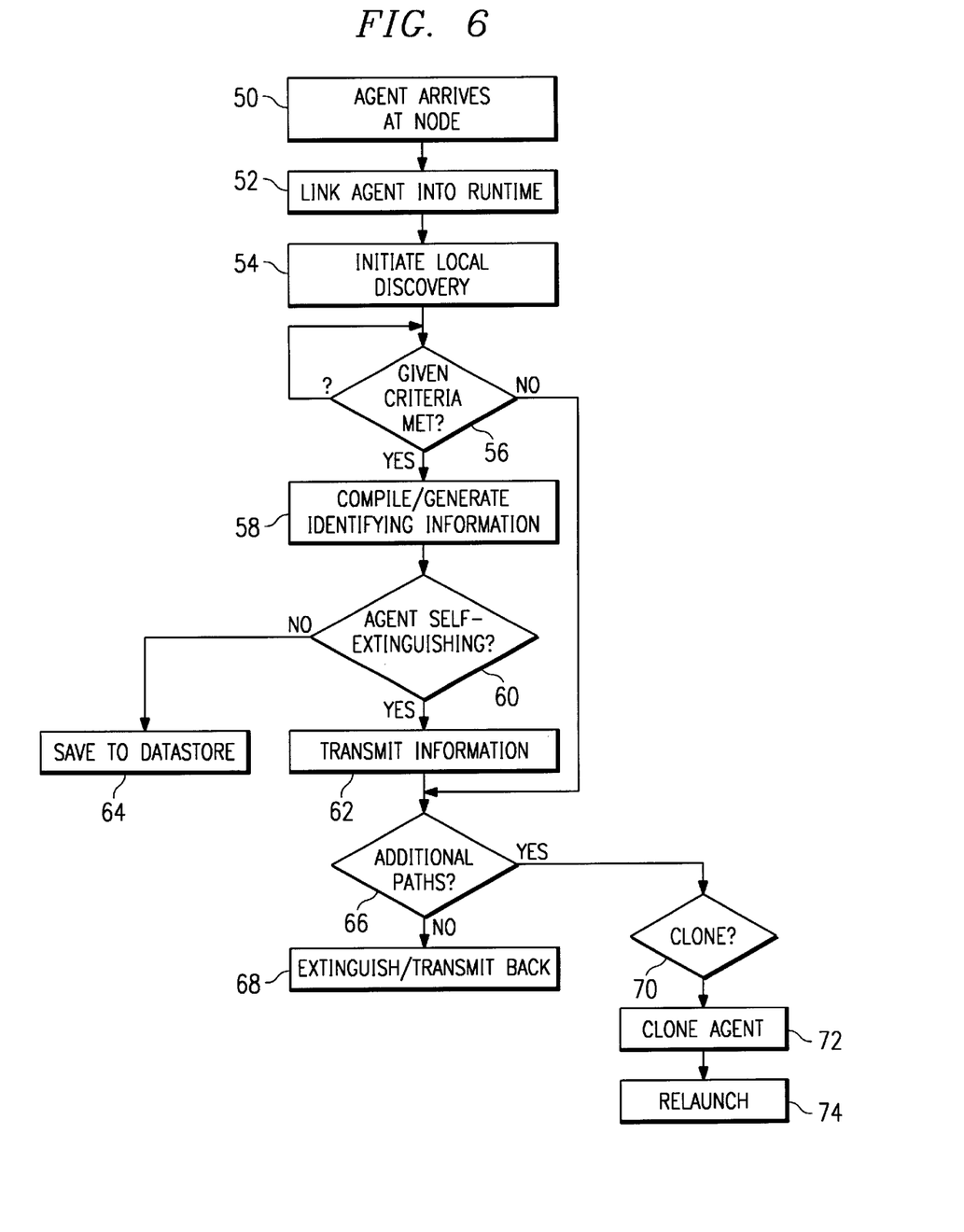
FIG. 6 is a flowchart of a software agent local discovery mechanism according to the preferred embodiment of this invention.

The flowchart of FIG. 6 illustrates the discovery operation at a particular node. The routine begins at step 50 when a given software agent arrives at the node. Of course, because multiple agents may be dispatched within the network, the routine shown in FIG. 6 may be carried out concurrently (or otherwise) on many different nodes in the network. At step 52, the discovery agent is linked to the local automation engine. Such linking typically involves binding the software agent into the runtime environment. The local discovery process is then initiated at step 54. At step 56, a test is performed to determine whether the system under test meets a given criteria (preferably as specified through the customization process described above). If the outcome of the test at step 56 is indeterminate, the routine cycles as illustrated. If, however, the outcome of the test at step 56 indicates that the machine (or some given component thereof) satisfies the search criteria specified by the software agent, the routine branches to step 58.

At this point in the routine, the software agent collects, compiles or otherwise generates appropriate information that may be required or desired by the dispatch mechanism. This information includes, for example, information or data identifying the host platform, its location and other identifying characteristics, information identifying a current state of operating components, and the like. The particular type of information will vary depending on the task to be deployed or, more generally, the nature of the discovery operation per se. At step 60, a test is made to determine whether the software agent is self-extinguishing, i.e. whether the agent is to extinguish or "kill" itself upon completion of the search over a given network path. If the outcome of the test at step 60 indicates that the software agent is self-extinguishing, the routine continues at step 62 by transmitting the identifying information back to through the network, e.g., using a local message facility. If the software agent is not self-extinguishing, the identifying information is written to a datastore associated with the agent at step 64. Such information is later disgorged when the software agent returns to the dispatch mechanism. A typical datastore is located "within" the agent code itself. Alternatively, the identifying information may be stored at the platform.

Control then continues at step 66. This step is also reached in the main processing loop if the outcome of step 56 indicates that the platform does not qualify under the search criteria. At step 66, a test is performed to determine whether other additional network paths should be traversed. The criteria for determining this question may be simple, e.g., the particular machine is an endpoint (in which case, no further transversal is required), or it be more complex. If the outcome of the test is negative, the routine either extinguishes the software agent (if the result of the test at step 60 was positive), or the software agent is launched back toward the dispatch mechanism. This is step 68. If, however, the outcome of the test at step 66 is positive, there are additional network paths to be traversed by the software agent.

The routine then continues at step 70 to test whether the software agent is to be cloned to continue the search. Under certain circumstances, e.g., where the software agent might be useful for some other diagnostic purposes, it may be desirable to maintain the agent at the platform after the local discovery has been completed. Thus, for example, a future discovery operation at the node may be simplified by having a previously executed agent (or some portion thereof) already resident.

Thus, the software agent generally includes the capability to return to the dispatcher, to remain at the node, or to clone and launch another instance of itself to continue the search. If the outcome of the test at step 70 is positive, the software agent is cloned at step 72 and then launched over an identified path at step 74. This routine continues in an iterative manner until all software agents have either extinguished themselves or returned back to the dispatcher. Information returned to the dispatcher preferably is stored for reference purposes to facilitate (e.g., narrow) future search "fields".

Thus, the present invention provides a mechanism for-discovering the locations and characteristics of target workstations for some task to be deployed in the environment. The task itself may be a software agent or any other type of application, process or other routine. If prior discovery has occurred, information derived therefrom may be used to facilitate the deployment. However, where such information is not available or is otherwise not useful (e.g., because it is outdated), one or more discovery agents are first launched to discover the required information. The discovered information is then returned to the dispatcher for use to facilitate the "targeted" distribution of the task.

One of ordinary skill will appreciate that the dispatcher may direct the search strategy in one or more ways to reduce the number of software agents required or the number of nodes that must be visited to generate the list of target nodes. The software agent(s) might then be deployed to the general "target" area from which the specific target locations are then identified.

In one preferred embodiment, the agent is an object composed of a set of tasks routable to appropriate systems in the large, distributed computer network. The set of tasks may be coupled together as may be necessary to diagnose and/or correct the fault. At each node, the agent is preferably incorporated into or otherwise executed by the previously-deployed runtime environment. Thus, as a large portion (namely, the runtime engine) of the discovery capability is already at the system to be evaluated, network traffic is further minimized.

Once the target machines have been identified, the task is deployed to these machines or some other given action is taken. For example, a "map" of the target machines may be stored at the dispatcher or elsewhere to facilitate a subsequent deployment at a later time. Thus, the discovery mechanism is also useful for "charting" or "mapping" the topology of the networked environment for research or other purposes. When a task is later deployed, the deployment is focused to only those regions of the managed network that are required to receive the task. This greatly reduces bandwidth and thereby conserves network resources.

A particular agent may not have the necessary code to determine whether the node is a suitable target. The agent may have the necessary code or it may send requests to the dispatch mechanism for additional code to effect the local discovery process. The additional code may be other software agent(s).

The software agent is preferably a smallest amount of software code that is necessary to discover the target machine or to perform some task associated with the local discovery process. By distributing some of the discovery functionality in the engine, network bandwidth is conserved because only a small amount of code needs to be dispatched to the target site. This further reduces complexity and cost of systems management in the large enterprise environment.

Preferably, the client-class framework running on each endpoint is a low-maintenance, low-cost framework that is ready to do management tasks but consumes few machine resources (because it is normally in an idle state). Each endpoint preferably is "dataless" in the sense that system management data is not stored therein before or after a particular system management task is implemented or carried out. This architecture advantageously enables a rational partitioning of the enterprise with 10's of servers, 100's of gateway machines, and 1000's of endpoints. Each server typically serves up to 200 gateways, each of which services 1000's of endpoints. At the framework level, all operations to or from an endpoint pass through a gateway machine. In many operations, the gateway is transparent; it receives a request, determines the targets, resends the requests, waits for results, then returns results back to the caller. Each gateway handles multiple simultaneous requests, and there may be any number of gateways in an enterprise, with the exact number depending on many factors including the available resources and the number of endpoints that need to be serviced.

In the preferred embodiment, these and other objects are thus achieved in a large distributed enterprise that includes computing resources organized into one or more managed regions, each region being managed by a management server servicing one or more gateway machines, with each gateway machine servicing a plurality of endpoint machines. As has been illustrated and described, a system management framework is preferably "distributed" on the gateway machines and the one or more endpoint machines to carry out system management tasks. Although the above environment is preferred, one of ordinary skill will appreciate that the inventive concepts may be implemented in smaller distributed client server network environments. Thus, the invention should not be construed to be limited to a particular large scale, distributed computing environment as described in the preferred embodiment.

One of the preferred implementations of the invention is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. Moreover, the inventive diagnostic technique should be useful in any distributed network environment.

Having thus described our invention, what we claim as new and desire to secure by Letters Patent is set forth in the following claims.

We claim:

1. A method of discovery in a distributed computer network having a management server servicing a set of machines, comprising the steps of:

deploying instances of a runtime engine across a subset of the machines to create a distributed runtime environment in the distributed computer network;

in response to a task deployment request, migrating a discovery agent across a given set of nodes in the computer network; and executing the discovery agent in the runtime environment at each node at which the discovery agent is received to perform the following steps:

(a) determining whether the machine at the node is a target of the task deployment request;

(b) identifying a given subset of nodes associated with the node that remain candidates for the task deployment request;

(c) deploying the discovery agent to the given subset; and (d) repeating steps (a)–(c) until the targets are identified or all network paths are exhausted.

2. The method as described in claim 1 further including the step of compiling a list of machines that are to receive the task deployment.

3. A method of discovery in a distributed computer network having a management server servicing a set of machines, comprising the steps of:

deploying instances of a runtime engine across a subset of the machines to create a distributed runtime environment in the distributed computer network;

in response to a task deployment request, deploying a discovery agent into the computer network from a source; and at a given machine supporting an instance of the runtime engine, executing the discovery agent using the runtime engine to perform a discovery operation.

4. The discovery method as described in claim 3 wherein the discovery operation is selected from a group of discovery operations consisting of identifying machines suitable for a task deployment, identifying a set of resources associated with a machine, identifying a machine type, and identifying a given characteristic of a resource at a machine.

5. The discovery method as described in claim 3 further including the step of collecting information discovered by the discovery agent.

6. The discovery method as described in claim 5 further including the step of returning the discovery agent to the source.

7. The discovery method as described in claim 3 further including the step of cloning the discovery agent at the machine.

8. The discovery method as described in claim 7 further including the step of launching the cloned discovery agent along a new path in the computer network.

9. The discovery method as described in claim 3 wherein the runtime environment comprises a runtime engine and the discovery agent is a set of one or more tasks executable by the runtime engine.

10. The method as described in claim 9 wherein the computer network is the Internet, the runtime engine is associated with a browser and the discovery agent is an applet.

11. A task discovery method in a large, distributed computer network having a management server servicing a set of machines, wherein a given subset of the machines include a previously-deployed runtime environment, comprising the steps of:

in response to a task deployment request, launching discovery agents into the computer network from the management server;

at a given machine in the subset, executing one of the discovery agents using the runtime environment on the machine;

returning information to the management server identifying the machines in the subset that are to receive a task deployment.

12. The method as described in claim 11 further including the step of displaying a list of the machines identified.

13. The method as described in claim 11 wherein at least one of the discovery agents is customized based on the task deployment request.

14. The method as described in claim 11 wherein the runtime environment comprises a runtime engine and each discovery agent is a set of one or more tasks executable by the runtime engine.

15. The method as described in claim 14 wherein the computer network is the Internet, the runtime engine is associated with a browser and the discovery agent is an applet.

16. A task discovery method operative in a large, distributed computer network in which a management infrastructure is supported, comprising the steps of:

selecting at least one software agent from a set of software agents; and migrating the selected software agent across a given set of nodes in the computer network to identify target machines for the task deployment.

17. The method as described in claim 16 wherein the selecting step includes identifying a given characteristic of the task and selecting the software agent based on the given characteristic.

18. The method as described in claim 16 wherein the migrating step includes cloning the software agent at given node and moving the cloned software agent along a network path.

19. The method as described in claim 16 wherein the management infrastructure includes a runtime environment deployed at given nodes of the computer network and the software agent is a set of one or more tasks executed by the runtime environment.

20. The method as described in claim 19 wherein the computer network is the Internet, the runtime environment is associated with a browser and the software agent is an applet.

21. An apparatus connectable into a large distributed enterprise having a management server servicing a set of endpoint machines for effecting a discovery operation, comprising:

a plurality of instances of a runtime engine, with each instance supported at a given endpoint machine;

means, responsive to a task deployment request, for selecting a software agent executable by the runtime engine at a given endpoint machine; and means for deploying the selected software agent into the computer network to perform a discovery operation.

22. A discovery system connectable into a large distributed enterprise having a management server servicing a set of endpoint machines for deploying a task, comprising:

a plurality of instances of a runtime engine each supported on a given endpoint machine; and means, responsive to a discovery request, for dispatching a set of one or more software agents into the distributed enterprise to identify machines that satisfy a given criteria, wherein a given software agent is executable by the runtime engine at a given endpoint machine.

23. The system as described in claim 22 wherein the given criteria is a determination that the endpoint machine is a candidate for the discovery operation.

24. The system as described in claim 22 further including means for generating software agents.

25. The system as described in claim 24 wherein the generating means includes means for customizing a given software agent as a function of the discovery operation.

26. A computer program product in a computer-readable medium for use in a computer having a processor, a memory, and means for connecting the computer into a large distributed enterprise having a management server, the computer program product comprising:

a runtime engine downloaded to the computer during a first operation; and a software agent deployed to the computer during a discovery operation and being executable by the runtime environment to discover whether the computer satisfies a given criteria.

27. The computer program product as described in claim 26 wherein the software agent includes one or more tasks selected as a function of the discovery operation.

28. The computer program product as described in claim 26 wherein the runtime environment is associated with a browser of the computer and the software agent is an applet.

29. A computer program product in a computer-readable medium for use in a computer having a processor, a memory, and means for connecting the computer into a large distributed computer network, the computer network having a management server servicing a set of machines, the computer program product comprising:

a plurality of instances of a runtime engine, each runtime engine for use at a given machine;

a set of software agents, each of the software agents comprising a set of one or more tasks;

means, responsive to a given request, for selecting a software agent to be deployed into the network, the software agent being executable by the runtime engine at a given endpoint machine to determine whether the given endpoint machine is a candidate to receive a task to be subsequently deployed.

* * * * *